(12) United States Patent
Yumita et al.

(10) Patent No.: US 7,943,264 B2
(45) Date of Patent: May 17, 2011

(54) OPERATION CONTROL OF A FUEL CELL SYSTEM

(75) Inventors: Osamu Yumita, Nagoya (JP); Keizou Mizuno, Tougou-cho (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 1359 days.

(21) Appl. No.: 11/249,448

(22) Filed: Oct. 14, 2005

(65) Prior Publication Data
US 2006/0029847 A1 Feb. 9, 2006

Related U.S. Application Data

(63) Continuation of application No. PCT/JP2004/005524, filed on Apr. 16, 2004.

(30) Foreign Application Priority Data

May 16, 2003 (JP) ................................. 2003-138260

(51) Int. Cl.
*H01M 8/04* (2006.01)
*H01M 8/00* (2006.01)
(52) U.S. Cl. ......... 429/443; 429/446; 429/427; 429/414
(58) Field of Classification Search .................. None
See application file for complete search history.

(56) References Cited

U.S. PATENT DOCUMENTS

| 5,939,218 | A | 8/1999 | Mizuno |
| 6,524,733 | B1 | 2/2003 | Nonobe |
| 6,790,549 | B2 | 9/2004 | Nonobe |

FOREIGN PATENT DOCUMENTS

| EP | 0 716 463 A2 | 6/1996 |
| JP | A 54-144934 | 11/1979 |
| JP | A-59-111273 | 6/1984 |
| JP | A 63-110558 | 5/1988 |
| JP | 07-235324 A * | 9/1995 |
| JP | A 07-235324 | 9/1995 |

(Continued)

OTHER PUBLICATIONS

Partial translation of Nariyuki, JP 07-235324 by STIC translator (paragraphs 0057-0070).*

(Continued)

*Primary Examiner* — Dah-Wei Yuan
*Assistant Examiner* — Angela J. Martin
(74) *Attorney, Agent, or Firm* — Oliff & Berridge, PLC

(57) ABSTRACT

For a fuel cell system, the flow rate and the pressure of the air flow supplied to the cathode side are controlled with the following procedure. First, air is supplied to the cathode at the flow rate and supply pressure required for generating electricity. In this state, the changing rate of the amount of formed water accumulated in the cathode is estimated based on the required electricity generation and the air flow rate. When the accumulated amount of formed water increases in a high rate, to avoid flooding, the cathode outlet regulation valve is intermittently opened to decrease the outlet gas pressure. Also, at a frequency less than that of the pressure decrease, the air flow rate is increased. By executing this operation, the increased air flow rate and the pressure difference between the cathode inlet and outlet, it is possible to promote discharge of the formed water with small loss of energy.

2 Claims, 3 Drawing Sheets

FOREIGN PATENT DOCUMENTS

| | | |
|---|---|---|
| JP | A 11-162490 | 6/1999 |
| JP | A 11-191423 | 7/1999 |
| JP | A 2000-243418 | 9/2000 |
| JP | A-2002-134150 | 5/2002 |
| JP | A 2002-198069 | 7/2002 |
| JP | A 2002-246045 | 8/2002 |
| JP | A 2004-071307 | 3/2004 |

OTHER PUBLICATIONS

Kenji Shinozaki, "Pressure Control Integrated Gas System," *Measuring Technology*, 2001, vol. 29 No. 10, pp. 27-28.

Mar. 16, 2010 Office Action for Japanese Patent Application No. 2003-138260 (with translation).

\* cited by examiner

OPERATION CONTROL OF A FUEL CELL SYSTEM

This is a Continuation of Application No. PCT/JP2004/005524 filed Apr. 16, 2004, which claims benefit of Japanese Patent Application No. 2003-138260 filed May 16, 2003. The entire disclosure of the prior applications is hereby incorporated by reference herein in its entirety.

TECHNICAL FIELD

The present invention relates to the operation control of a fuel cell system for generating electricity by an electrochemical reaction of hydrogen and oxygen.

BACKGROUND ART

In recent years, fuel cell for generating electricity by an electrochemical reaction between hydrogen and oxygen has been focused on as an energy source. The fuel cell is configured with a hydrogen electrode and an oxygen electrode sandwiching an electrolyte. When hydrogen-rich fuel gas is supplied to the hydrogen electrode and oxidizing gas such as air is supplied to the oxygen electrode, the hydrogen and oxygen in these gases react to form water while generating electricity. This reaction mainly occurs at the oxygen electrode. When a large amount of water is formed by the reaction, there is a case to be impossible to discharge the formed water and the formed water causes clogging of oxidizing gas piping depending on the fuel cell operating condition. This phenomenon called flooding causes interference of oxidizing gas supply to the oxygen electrode. By the interference, the performance of the electricity generation becomes lower and an adverse effect such as shortening of the fuel cell lifetime may occur. The flooding occurs easily when the operating condition for which the oxidizing gas flow rate is relatively small, such a condition as generating electricity at a low current density.

JP63-110558A discloses a technique for suppressing flooding by increasing the flow rate of oxidizing gas intermittently.

To increase the flow rate of oxidizing gas, it is necessary to increase the pump power of a pump for supplying the oxidizing gas. Increase of the pump power may cause a decrease in energy efficiency of fuel cells. Also the increase in the flow rate may be delay after the increase of the pump power, so there is the problem that the responsiveness is not enough for suppression of flooding by increasing the flow rate of the oxidizing gas. Due to this kind of low responsiveness, with the conventional art, it is necessary to increase the oxidizing gas before the flooding occurred, and there is also the problem of decreasing the energy efficiency. The present invention is created considering these problems, and its purpose is to provide a technology capable of avoiding flooding while suppressing a decrease in energy efficiency.

DISCLOSURE OF THE INVENTION

The fuel cell system of the present invention has as its subject fuel cells for generating electricity by an electrochemical reaction between hydrogen supplied to a hydrogen electrode and oxidizing gas supplied to an oxygen electrode. The present invention is applicable for various types of fuel cells. Of the various types of fuel cells, the polymer electrolyte type which uses a solid polymer such as Nafion (registered trademark) for the electrolyte is preferable. The fuel cell system comprises an outlet gas pressure adjustment mechanism for adjusting the outlet gas pressure of the oxygen electrode, and a pressure control unit for controlling the adjustment mechanism. The pressure control unit controls the outlet gas pressure adjustment mechanism so that the outlet gas pressure is intermittently reduced from the standard pressure maintained during normal operation. As the outlet gas pressure adjustment mechanism, for example, equivalents include a pressure adjustment valve provided at the outlet side of the oxygen electrode, a pressurization pump for supplying the oxidizing gas.

By lowering the outlet gas pressure, because the outlet gas pressure of the oxygen electrode becomes excessively lower than the inlet gas pressure, water within the oxygen electrode is discharged. With the present invention, by intermittently performing water discharge using this discharge method, it is possible to suppress flooding while maintaining the humidity necessary for the electrolytic membrane. Generally, the driving power required to reduce the outlet gas pressure is lower than the power required to increase the flow rate of oxidizing gas, so with the present invention, it is possible to suppress the energy loss that accompanies water discharge. There is also the advantage of being able to improve the responsiveness of the water discharge process with the present invention because the pressure changing speed is relatively fast.

With the present invention, it is also possible to perform flow rate control of the oxidizing gas together with the control of the outlet gas pressure. For example, the fuel cell system of the present invention may also comprise a flow rate adjustment mechanism for adjusting the flow rate of the oxidizing gas supplied to the oxygen electrode, and when the pressure is reduced, under specified conditions, the flow rate adjustment mechanism may perform control so as to increase the flow rate. The flow rate adjustment mechanism, for example, may be the equivalent of a pressurization pump for supplying oxidizing gas, such as a flow rate adjustment valve provided at the oxidizing gas supply system.

By increasing the flow rate in this way, it is possible to realize water discharge even more efficiently. The "specified conditions" for increasing the flow rate can be set in various manners. For example, it is possible to increase the flow rate each time the pressure is reduced, or to increase the flow rate once for every several reductions of the pressure. Also, when it is decided that sufficient water discharge is not foreseen only with a decrease in pressure, for example, it is also possible to increase the flow rate when the difference pressure of the inlet gas pressure and the outlet gas pressure of the fuel cell is a specified value or less. Generally, a relatively large driving power is required to increase the flow rate, so from the perspective of energy efficiency, it is preferable to perform reduction of the pressure with a higher priority than increasing the flow rate for the water discharge.

With the present invention, the timing for executing water discharge control such as a decrease in pressure can be performed in various ways. It is possible to repeatedly perform water discharge control at predetermined cycles, or to determine whether water discharge control is necessary or not from the operating state of the fuel cell system. With the latter aspect, it is possible to estimate the water accumulation in the oxygen electrode or variation thereof and it is possible to determine whether the water discharge control is necessary or not based on those results. When the fuel cell system determines that the water accumulation or the variation thereof based on this estimate has exceeded the specified acceptable value, it is possible to execute the water discharge control. In this way, it is possible to suppress useless execution of water discharge control and to improve the energy efficiency.

Changing of the water accumulation may be obtained by the difference between the generated water amount and the amount of water that can be discharged, for example. Also, if the variation obtained in this way is time integrated, it is possible to estimate the water accumulation. The generated amount used with this estimation is a function of the electricity generation and duration of the electricity generation. The amount of water that can be discharged is a function of the oxidizing gas flow rate and the oxidizing gas pressure or temperature. Pressure and temperature are parameters for defining the amount of water vapor that can be contained as saturated vapor in the gas discharged from the oxygen electrode. The generated amount and amount of water that can be discharged can be obtained by storing in advance the map and numeric formula for giving the water generation amount and amount of water that can be discharged for these parameters.

The acceptable value for determining whether or not water discharge control is necessary may be set in various ways. For the water accumulation, the acceptable value can be set to a range lower than the water accumulation determined to generate flooding. For example, by using 0 as the acceptable value, it is also possible to determine that water discharge control is necessary when the value of water accumulation increases. These acceptable values may be fixed values, or may be varied according to the requested electricity generation and so on.

With the present invention, for the outlet gas pressure may be only reduced from the standard pressure. But it is desirable to use the sequence of raising the outlet gas pressure and then reducing the outlet gas pressure from the standard pressure. By raising the outlet gas pressure higher than the standard pressure, it is possible to enlarge the difference pressure between the inlet gas pressure and the outlet gas pressure when lowering the pressure, and to realize efficient water discharge.

When the outlet gas pressure is lowered without limit, this invites a decrease of the inlet gas pressure together with time, and thus, there is a possibility of inviting insufficient supply of oxidizing gas. To suppress this disadvantage, it is also possible to place a limit of performing the decrease in the outlet gas pressure for the present invention under the restriction of maintaining the inlet gas pressure of the oxygen electrode at a specified value or higher. In this way, the inlet gas pressure is maintained at a specified value for which it is possible to realize a suitable supply of oxidizing gas, so it is possible to operate the fuel cell with stability. This control, for example, can be realized by prohibiting a decrease in the outlet gas pressure at a point in time at which it is determined that the inlet gas pressure is lower than the specified value.

With the present invention, it is possible to provide the outlet gas pressure adjustment mechanism at various sites. As the outlet gas pressure adjustment mechanism, it is possible to provide a pressure adjustment value provided at the exhaust pipe for performing exhaust from the oxygen electrode of the fuel cell, for example. With this aspect, the pressure adjustment valve can be used together for exhaust flow rate control and water discharge control, so it is possible to simplify the device arrangement. As the outlet gas pressure adjustment mechanism, it is also possible to provide a water discharge pipe for performing water discharge from this oxygen electrode separate from the exhaust pipe, and to provide an opening and closing mechanism that is kept in a closed state during normal operation such as a stop valve at the midstream of the water discharge piping. With this mechanism, the water discharge pipe can be designed more freely, so it is possible to realize water discharge efficiently.

With the present invention, it is possible to suitably combine and partially omit the features described above. Also, the present invention is not limited to a fuel cell system, but may also constitute various aspects such as a fuel cell system operation control method and so on. When constituted as an operation control method as well, it is possible to suitably apply the various characteristics described above.

BEST MODE FOR CARRYING OUT THE INVENTION

Figure 1:
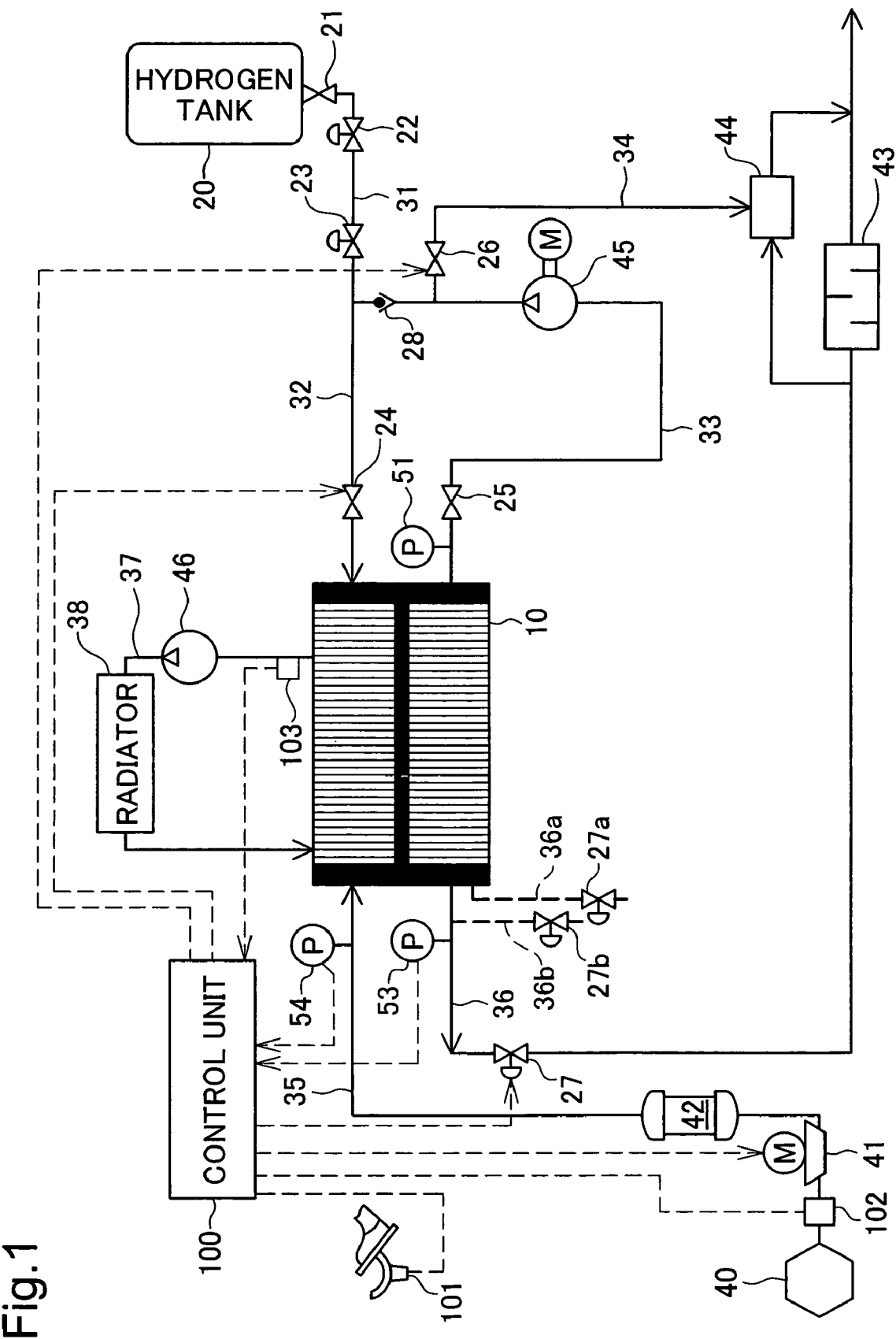
FIG. 1 is an explanatory drawing showing the overall arrangement of the fuel cell system as an embodiment.

The embodiments of the present invention are described in the following order.
A. Device Arrangement:
B. Operation Control Process:
C. Water Discharge Control:
D. Variation Example:
A. Device Arrangement:

FIG. 1 is an explanatory drawing showing the overall arrangement of the fuel cell system as an embodiment. The fuel cell system in this embodiment is incorporated in an electric vehicle driven by a motor as a power source. When the driver depresses the accelerator, power generation is performed according to the depression amount detected by the accelerator opening sensor 101, and it is possible to run the vehicle using this power. The fuel cell system does not have to be placed within the vehicle as this embodiment. The present invention may be applicable for the fuel cell systems with various arrangements such as the stationary type fuel cell system.

The fuel cell stack 10 is a stack of cells for generating electricity by an electrochemical reaction of hydrogen and oxygen. Each cell is configured with a hydrogen electrode (hereafter called an anode) and an oxygen electrode (hereafter called a cathode) sandwiching an electrolytic membrane. In this embodiment a polymer electrolyte fuel cell with a solid polymer membrane such as Nafion (registered trademark) is used as the electrolytic membrane. The present invention is not limited to this type of fuel cell. The present invention is also applicable for various types of fuel cell.

As the gas containing oxygen, compressed air is supplied to the cathode of the fuel cell stack 10. The intake air from the filter 40 is compressed by the compressor 41. After the compression, the air is humidified by the humidifier 42 and supplied to the fuel cell stack 10 through the piping 35. The air supply pressure detected by the pressure sensor 54 is adjusted to a specified standard pressure such as 170 kPa. The temperature sensor 102 for detecting the intake temperature is provided in the piping 35. The exhaust from the cathode (hereafter called the cathode off gas) is discharged to the outside through the piping 36 and the muffler 43. The air supply pressure detected by the pressure sensor 53 provided in the piping 36 is adjusted to a specified standard pressure of 150 kPa by controlling the opening of the regulation valve 27.

When the opening of the regulation valve 27 is rapidly enlarged, the outlet gas pressure decrease and an excessive pressure difference between the inlet gas pressure and the outlet gas pressure of the cathode occurs. This pressure difference exhibits the effect of discharging the water formed within the cathode during electricity generation. In this sense, the regulation valve 27 is used not only for pressure control during normal operation, the regulation valve 27 is also possible to use as a valve for water discharge control of the generated water.

Hydrogen from the high pressure hydrogen stored in the hydrogen tank 20 is supplied via the piping 32 to the anode of the fuel cell stack 10. Instead of the hydrogen tank 20, it is also possible to form hydrogen by a reforming reaction using raw materials such as alcohol, hydrocarbons, aldehyde, and to supply this to the anode.

The hydrogen stored at high pressure in the hydrogen tank 20 has its pressure and supply adjusted by the shut valve 21, the regulator 22, the high pressure valve 23, and the low pressure valve 24, and is then supplied to the anode. The exhaust from the anode (hereafter called anode off gas) is flowed out to the piping 33. The pressure sensor 51 and the valve 25 are provided at the anode outlet, and these are used for controlling the supply pressure and quantity to the anode.

The piping 33 branches into two in midstream. One is connected to the discharge pipe 34 for discharging the anode off gas to the outside and the other is connected to the piping 32 via the check valve 28. As a result of the hydrogen being consumed by the electrical generation by the fuel cell stack 10, the anode off gas pressure goes to a relatively low, so the pump 45 for pressurizing the anode off gas is provided in the piping 33.

While the discharge valve 26 provided in the discharge pipe 34 is closed, the anode off gas circulates in the fuel cell stack 10 again via the piping 32. Hydrogen that is not consumed with electricity generation remains in the anode off gas, so it is possible to effectively use the hydrogen by circulating in this way.

During circulation of the anode off gas the hydrogen is consumed for electricity generation. On the other hand impurities other than hydrogen such as nitrogen from the cathode penetrated through the electrolytic membrane are not consumed and remain. This is because the concentration of impurities gradually increases. In this state to reduce the concentration of impurities that are circulating the discharge valve 26 is opened. When the discharge valve 26 opens, the anode off gas passes through the discharge pipe 34 and is discharged to the outside after being diluted by air at the diluter 44. However, at the same time, hydrogen is discharged also. So the opening of the discharge valve 26 is preferably suppressed as much as possible from the perspective of fuel consumption improvement.

In addition to hydrogen and oxygen, cooling water is also supplied to the fuel cell stack 10. The cooling water is flowed in the piping 37 by the pump 46. The cooling water is cooled by the radiator 38 and is supplied to the fuel cell system 10. A temperature sensor 103 for detecting the temperature of the cooling water is provided at the outlet from the fuel cell stack 10.

The operation of the fuel cell system is controlled by the control unit 100. The control unit 100 is configured as a microcomputer internally comprising a CPU, RAM, and ROM, and the system operation is controlled according to the program stored in the ROM. In the figure, an example of signals input and output to the control unit 100 for realizing this control is shown. As input, for example, there are detection signals of the temperature sensor 102, the temperature sensor 103, and the accelerator opening sensor 101. Also, the detection signals from the pressure sensor 54 for detecting the inlet gas pressure of the cathode and from the pressure sensor 53 for detecting the outlet gas pressure are input to the control unit 100. As output, examples include the low pressure valve 24, the discharge valve 26, the regulation valve 27, and the compressor 41.

As shown by the dashed line in the drawing, it is also possible to provide the piping 36a or the piping 36b for water discharge on the cathode outlet of the fuel cell 10. The piping 36a is provided separate from the piping 36 of the cathode off gas, and this is an example linked with the gas flow path within the cathode inside the fuel cell 10. The piping 36b is an example provided as a branch from the cathode off gas piping 36. Valves 27a and 27b for water discharge are provided in each piping 36a and 36b. These valves 27a and 27b are closed during normal operation and are opened during water discharge by a control signal from the control unit 100. When these valves 27a and 27b open, the cathode outlet gas pressure decrease rapidly and a pressure difference occurs with the inlet gas pressure. The pressure difference makes water formed within the cathode to be discharged. From the perspective of efficacy of water discharge, it is preferable to provide the piping 36a and the valve 27a.

Figure 2:
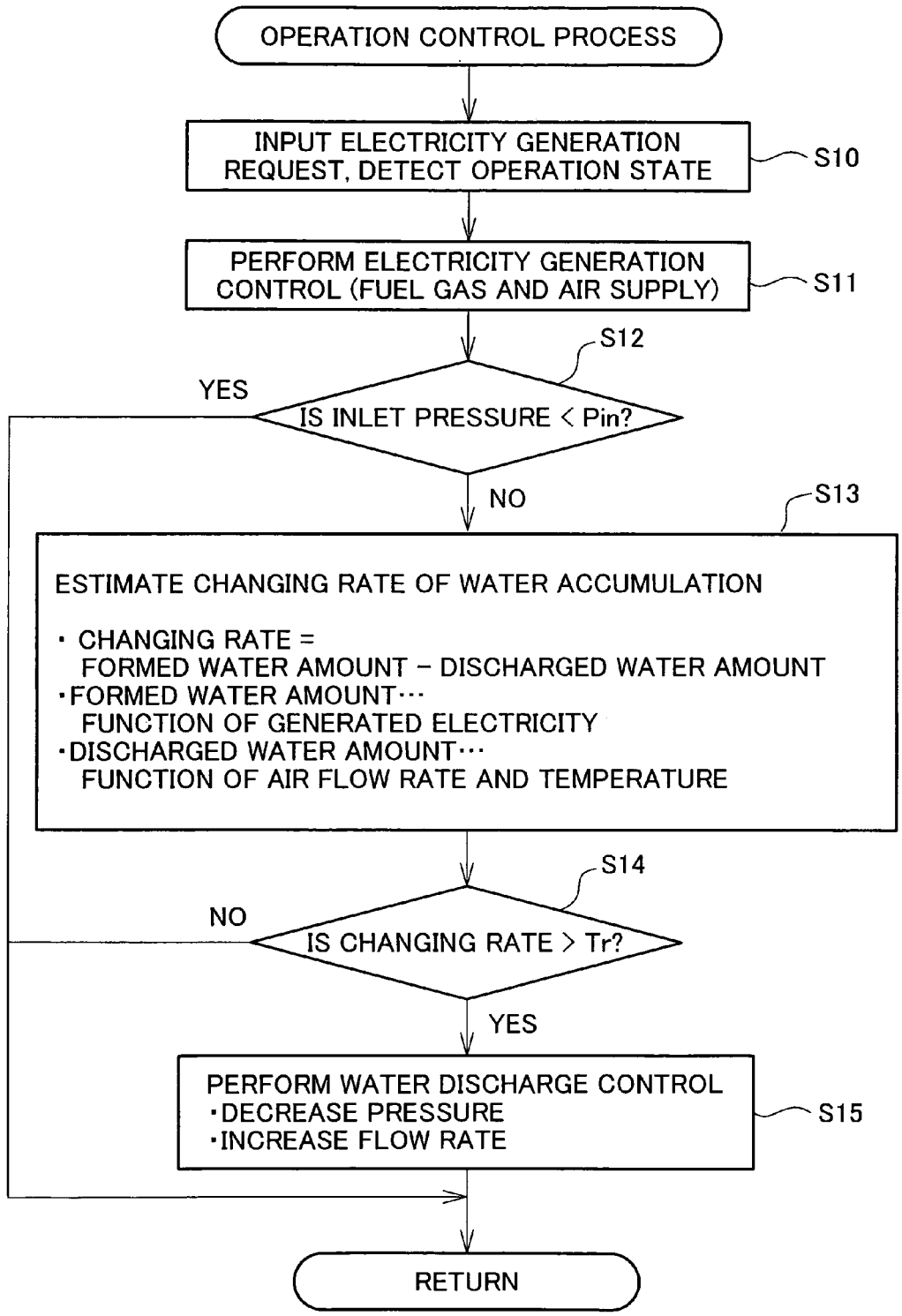
FIG. 2 is a flow chart of the operation control process.

B. Operation Control Process:

FIG. 2 is a flow chart of the operation control process. This is a process that is repeatedly executed by the control unit 100 at a specified timing.

When the process starts, the control unit 100 performs input of the electricity generation request and detection of the operation state (step S10). Also, the control unit 100 performs electricity generating control, specifically, control of the fuel gas and air supply, based on this electricity generation request (step S11).

Next, the control unit 100 executes water discharge control for water formed during electricity generation. With this embodiment, water is discharged by the pressure difference between the inlet gas pressure and the outlet gas pressure which is caused by opening of the regulation valve 27 at the cathode outlet.

At first, to execute this water discharge control, the control unit 100 determines whether or not the cathode inlet gas pressure is below the specified threshold Pin (step S12). The threshold Pin is a value that is the criterion for determining whether or not to perform water discharge control. When the regulation valve 27 is opened, the inlet gas pressure decreases as time elapses, and it is possible that the air supply becomes insufficient. The threshold Pin is a value set for avoiding this kind of situation, and can be set based on the supply pressure for which it is possible to ensure an air flow rate required for continuing the operation with stability for the fuel cell 10.

When the inlet gas pressure is below the threshold Pin, the control unit 100 determines that water discharge control should not be executed, and ends the operation control process without performing water discharge control. It is possible to omit the determination relating to the inlet gas pressure (step S12), and it is also possible to use a flow of executing the process after step S13 unconditionally.

When the inlet gas pressure is greater than the threshold Pin, the control unit 10 estimates the changing rate of the water accumulation within the fuel cell 10 (step S13). The changing rate is obtained by the difference between the formed water amount and the discharge water amount per unit time. The formed water amount can be estimated as a function of the generated electricity. The relationship between the generated electricity and the formed water amount can be stored in the control unit 100 in advance as a map or a function. Generally, the value of the formed water amount becomes bigger with increase of the generated electricity.

The discharge water amount can be estimated as a function of the air flow rate and the temperature. Generally, the formed water is included as water vapor in the cathode off gas and discharged. The temperature is a parameter for defining saturated vapor concentration in the cathode off gas. As a parameter for defining the amount of the water vapor that can be contained in a unit volume of cathode off gas, it is also possible to obtain the discharge water amount considering the overall pressure of the cathode off gas further. The relationship between the discharge water amount and these parameters can be stored in the control unit 100 in advance as a map or a function. Generally, the discharged water amount becomes lower with decreasing of the air flow rate.

When the changing rate obtained in this way is less or equal to the specified threshold Tr (step S14), the control unit 100 determines the possibility of flooding occurring to be low, and ends the operation control process without performing water discharge control. The threshold Tr is a value that is the criterion for determining whether or not flooding occurs, and any setting is possible based on experiments or analysis. When the threshold Tr is set high, the frequency of the water discharge control is low, so flooding occurs more easily. When the threshold Tr is set low, the water discharge control is performed frequently, and the air supply pressure decreases, so this may invite a decrease in the electricity generating efficiency. The threshold Tr is preferably set considering both of these aspects. For example, if the threshold Tr is set to 0, when the changing rate is positive, in other words, when the water accumulation in the fuel cell 10 is in an increasing state, the water discharge control is performed.

When the changing rate exceeds the specified threshold Tr, the amount of formed water is large, so water discharge control is performed (steps S14 and S15). With this embodiment, the water discharge control is performed by combining the two methods. One of the methods is to decrease the cathode outlet gas pressure and the other is to increase the air flow rate.

Figure 3:
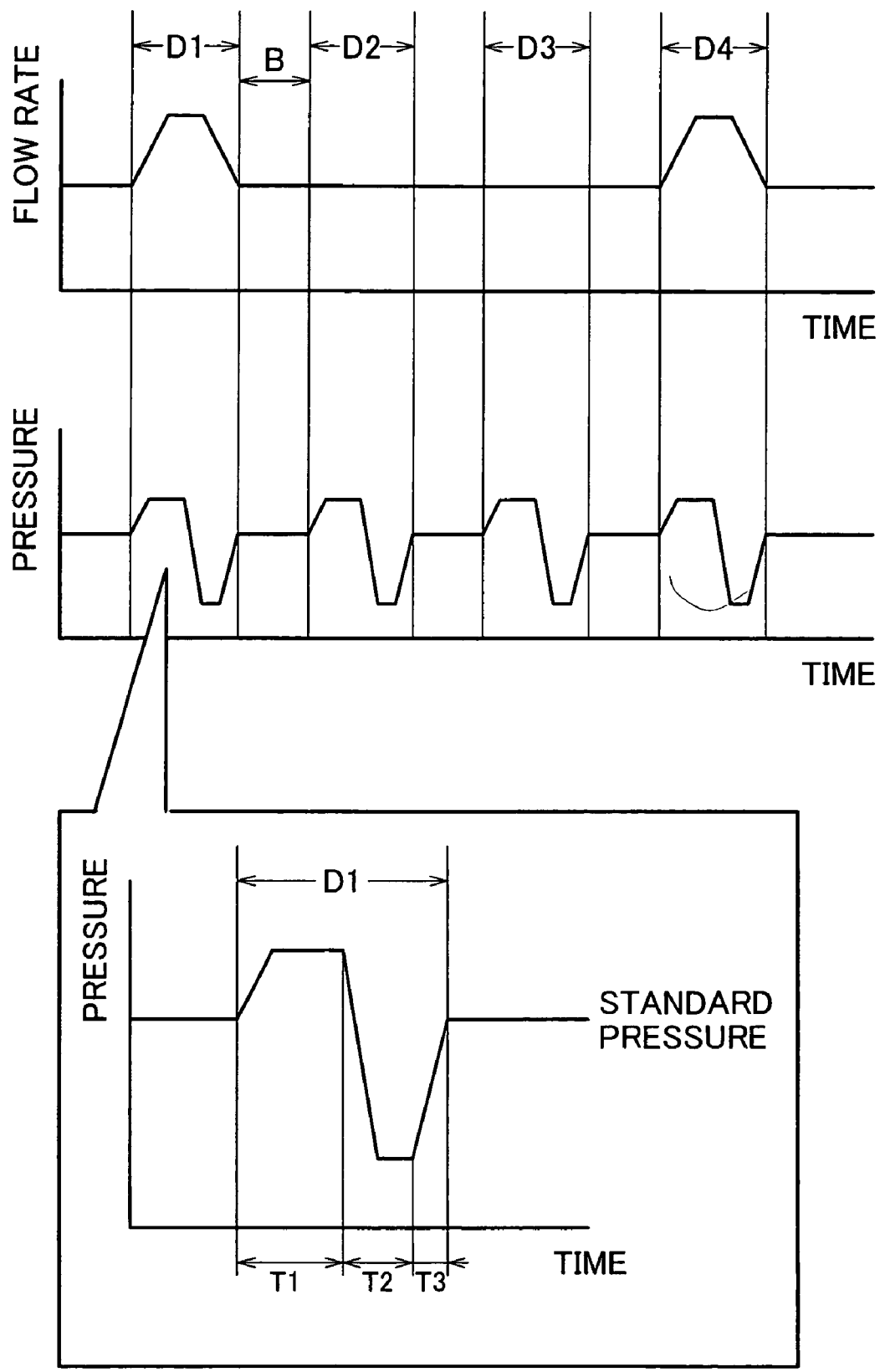
FIG. 3 is an explanatory drawing showing an example of the water discharge control.

C. Water Discharge Control:

FIG. 3 is an explanatory drawing showing an example of the water discharge control. This shows the changes in time of the cathode side air flow rate and outlet gas pressure after the water discharge control has started.

As shown in the drawing, with the water discharge control, the outlet gas pressure is intermittently decreased by releasing the regulation valve 27 intermittently. The periods D1 to D4 in the drawing indicate periods for which the pressure is decreased. When the outlet gas pressure is decreased, an excessive pressure difference occurs between the cathode inlet gas pressure and the outlet gas pressure, promoting water discharge. The pressure decrease periods D1 to D4 and the interval B can be fixed in advance or be changed according to the changing rate of the water accumulation.

At the bottom of the drawing, an example of a waveform when decreasing the pressure is shown by the enlarged drawing of the change in the outlet gas pressure in period D1. With this embodiment the outlet gas pressure is controlled as the waveform shown in the drawing. The outlet gas pressure is raised to higher pressure than the standard pressure during normal operation (period T1). Then the pressure is decreased to lower pressure than the standard pressure (period T2), and the pressure returned to the standard pressure (period T3). The increase in pressure can be achieved by, for example, an increase in the rotation of the compressor 41, or a decrease in the opening of the regulation valve 27. The decrease in pressure is realized by an increase in the opening of the regulation valve 27.

The duration of each period T1 through T3 may be set freely. It is preferable to set the duration of periods T1 and T2 so that the decreasing rate of the pressure at the period T2 is higher than the increasing rate at the period T1. By increasing the pressure in this way, the pressure difference between the inlet gas pressure and the outlet gas pressure during the pressure decrease may be expanded, and the water discharge efficiency may be improved. The waveform during the pressure decrease may be set in various ways without limiting it to the example shown in the drawing. It is also possible to omit the period T1 for increasing the pressure and to use a waveform that simply decreases from the standard pressure.

With this embodiment, to further improve the water discharge efficiency, as shown in the drawing, together with a decrease in the outlet gas pressure, the air flow rate is also increased. The increase in the flow rate can be achieved by an increase in the rotation of the compressor 41. With this embodiment, a frequency of the increase in the flow rate is less than that of the decrease in the outlet gas pressure, in other words, the increase in the flow rate is performed once each three pressure decreases. The flow rate increase frequency can be set freely, but it is also possible to set the same frequency as the pressure decrease. However, to increase the air flow rate, it is necessary to increase the driving power of the compressor 41, so from the perspective of the fuel cell system energy efficiency, it is preferable that the increase in the flow rate is less frequent.

The increase in the air flow rate does not necessarily have to be done cyclically. For example, it is also possible to increase the air flow rate only when the changing rate of the water accumulation is large and it is determined that suppression of flooding is not possible by the water discharge just performing the decrease in the pressure. It is also possible to change the frequency and period of increasing the flow rate according to the changing rate of the water accumulation. It is also possible to perform water discharge only with a decrease in the pressure, without performing an increase in the air flow rate.

With the fuel cell system of this embodiment described above, by performing water discharge control decreasing the outlet gas pressure intermittently, it is possible to suppress flooding while avoiding an extreme decrease in the energy efficiency. Also, by intermittently performing water discharge control, it is possible to maintain the necessary humidity for operating the fuel cell.

D. Variation Example:

The decrease in the outlet gas pressure for the embodiment may be realized by releasing the valves 27a and 27b shown by example in FIG. 1.

With the embodiment, an example of a determination whether or not water discharge control is necessary based on the changing rate of the water accumulation is shown. The determination whether or not water discharge control is necessary can also be based on various parameters. For example, it is also possible to use as the parameter the accumulated amount of formed water obtained by doing time integration of the changing rate shown in the embodiment. Also, as a different parameter, it is possible to use the required electricity generation. Generally, if we consider the fact that it is easy for flooding to occur when the required electricity generation is low, then it is possible to use a method for determining whether water discharge control is necessary or not based on a comparison of the generated electricity and a specified value.

Above, various embodiments of the present invention has been described, but the present invention is not limited to these embodiments, and it is clear that it is possible to use various arrangements in a range that will not stray from the key points.

INDUSTRIAL APPLICABILITY

The present invention is applicable for various types of fuel cell systems such as the in-vehicle type fuel cell system, the stationary type fuel cell system and so on.

What is claimed is:

1. A fuel cell system comprising:
   a fuel cell configured to generate electricity by electrochemical reaction of hydrogen supplied to a hydrogen electrode and oxidizing gas supplied to an oxygen electrode;
   an outlet gas pressure adjusting mechanism configured to adjust outlet gas pressure of the oxygen electrode;
   a pressure control unit configured to control the outlet gas pressure adjusting mechanism so that the outlet gas pressure is intermittently decreased from a standard pressure which is designed to be maintained during normal operation; and
   an estimation unit configured to estimate water accumulation or variation thereof within the oxygen electrode,
   wherein the pressure control unit executes the control of the outlet gas pressure when the water accumulation or the variation thereof estimated by the estimation unit exceeds a specified acceptable value, and
   wherein the flow rate of oxygen is increased less frequently than the intermittent decrease in the outlet gas pressure.

2. The fuel cell system of claim 1, wherein the outlet gas pressure is decreased after the outlet gas pressure is once increased.

* * * * *